United States Patent [19]
Sutton

[11] Patent Number: 6,023,240
[45] Date of Patent: Feb. 8, 2000

[54] METHOD FOR DETERMINING A PHASE MEASUREMENT ERROR MAP USING ROTATING ANTENNA INFORMATION

[75] Inventor: Eric C. Sutton, Coralville, Iowa

[73] Assignee: Rockwell Collins, Inc., Cedar Rapids, Iowa

[21] Appl. No.: 09/313,146

[22] Filed: May 17, 1999

[51] Int. Cl.[7] .............................. G01S 5/02; H04B 7/185
[52] U.S. Cl. .............................. 342/357.11; 342/357.11; 342/398
[58] Field of Search ........................ 342/357.06, 357.11, 342/398, 442, 449

[56] References Cited

U.S. PATENT DOCUMENTS

| | | | |
|---|---|---|---|
| 5,021,792 | 6/1991 | Hwang | 342/357 |
| 5,296,861 | 3/1994 | Knight | 342/357 |
| 5,548,293 | 8/1996 | Cohen | 342/357 |

Primary Examiner—Thomas H. Tarcza
Assistant Examiner—Dao L. Phan
Attorney, Agent, or Firm—Kyle Eppele; James P. O'Shaughnessy

[57] ABSTRACT

A method for calculating the phase reception pattern of an antenna system utilized in attitude determination is disclosed. The antenna system is disposed on a platform (or rate table) that rotates about a single, fixed axis at a constant rate as incoming signals from one or more satellites are received, thereby revolving the antennas about the axis. Information collected from the satellite signals is utilized to calculate a differential phase map (phase measurement error correction map) for the antenna system. The rate of rotation of the table is approximately known, and small variations in the rotation rate may be compensated. The baseline vector connecting two or more antennas is preferably approximately perpendicular to the axis of rotation of the platform. Phase measurement data is collected and may be processed off-line to compute a phase measurement correction map. Attitude calculations may be compensated with the determined differential phase measurement correction map.

20 Claims, 3 Drawing Sheets

METHOD FOR DETERMINING A PHASE MEASUREMENT ERROR MAP USING ROTATING ANTENNA INFORMATION

FIELD OF THE INVENTION

The present invention generally relates to the field of antenna systems, and particularly to techniques for determining a phase error map in an antenna system.

BACKGROUND OF THE INVENTION

Electronic antenna systems are utilized in systems that determine the attitude of an object or vehicle with respect to a fixed reference. In determining attitude, the difference in phase measurements between at least two antennas receiving an electromagnetic signal (such as from a satellite) is observed in order to calculate an attitude. The phase center of an antenna is a point on or near the surface of the antenna to which all of the phase measurements are referenced. For an ideal antenna, it is assumed that the antenna may be rotated about its phase center without affecting phase measurements. In practice, however, the position of the phase center varies with the angle of incidence of the incoming electromagnetic signal with respect to the antenna. If two antennas in an attitude determination system are precisely matched and mounted with the same orientation, then variations in the phase centers will cancel. However, this is often difficult to achieve in practice. As a result, phase measurements may be biased as much as ten millimeters. For an attitude system with limited baseline length and limited satellite visibility, phase measurement bias due to variations in antenna phase centers can produce significant errors in attitude calculations.

The differential phase map is the phase measurement error as a function of the angle of arrival of the incoming electromagnetic wave. The phase map is used for compensation that is necessary for accurate attitude determination. Variations in the phase center of an antenna can be compensated by assuming a fixed average phase center and then modeling a deterministic bias in the phase center where the bias is a function of the angle of incidence of the incoming electromagnetic signal. Typically, phase measurement errors (i.e. bias) in the antenna phase reception pattern may be determined by measuring the antenna phase reception pattern in an anechoic chamber. The phase measurement errors may then be subtracted from phase measurement data to compensate for the phase center bias. Since the bias is a function of the angle of incidence, at least an approximate attitude must be known before bias compensation may be utilized, which is not difficult to realize in practice. However, using an anechoic chamber to determine phase measurement errors is expensive, and it is often difficult to reproduce the antenna mounting arrangements of real systems in an anechoic chamber. Thus, there lies a need for an alternative, inexpensive method for determining phase measurement error in an antenna system that accurately models the antenna system configuration for which the phase measurement error is utilized.

SUMMARY OF THE INVENTION

The present invention provides a method for calculating the phase reception pattern of an antenna system utilized in attitude determination. The antenna system is disposed on a platform (or rate table) that rotates about a single, fixed axis at a constant rate as incoming signals from one or more satellites are received. The collected information from the satellite signals is utilized to calculate a differential phase map (phase measurement error correction map) for the antenna system. There is no requirement that any information about the orientation of the rotating platform be known a priori. The rate of rotation of the table is approximately known, and small variations in the rotation rate may be compensated. The baseline vector connecting two or more antennas is preferably approximately perpendicular to the axis of rotation of the platform. Phase measurement data is collected and may be processed offline to compute a phase measurement correction map.

Due to the predictable motion of the rate table, the axis of rotation and orientation of the rate table at any particular time can be calculated precisely. As the antenna array revolves, each visible satellite traces a spiral in the phase measurement correction map. Preferably, about two to three hours of data collection with good satellite visibility is long enough to achieve sufficient sample density to calculate a reliable phase correction map.

The method of the present invention provides the advantages that only signals from live satellites are required, only phase measurements and line of sight vectors need to be measured and recorded, only rotation about a single axis at a reasonably constant rate is required, and that the test setup is self calibrating such that no special alignment procedure is required.

Therefore, the present invention is directed to a method for determining a differential phase map for an antenna system utilized in attitude determination. In one embodiment, the method includes steps for rotating at least two antennas about an axis of rotation, receiving a carrier signal with the at least two antennas, determining phase measurement information from the carrier signal received by each of the at least two antennas, and calculating a differential phase map from the determined phase measurement information whereby the differential phase map may be utilized to correct differential phase measurements in an attitude determination system that utilizes said at least two antennas.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
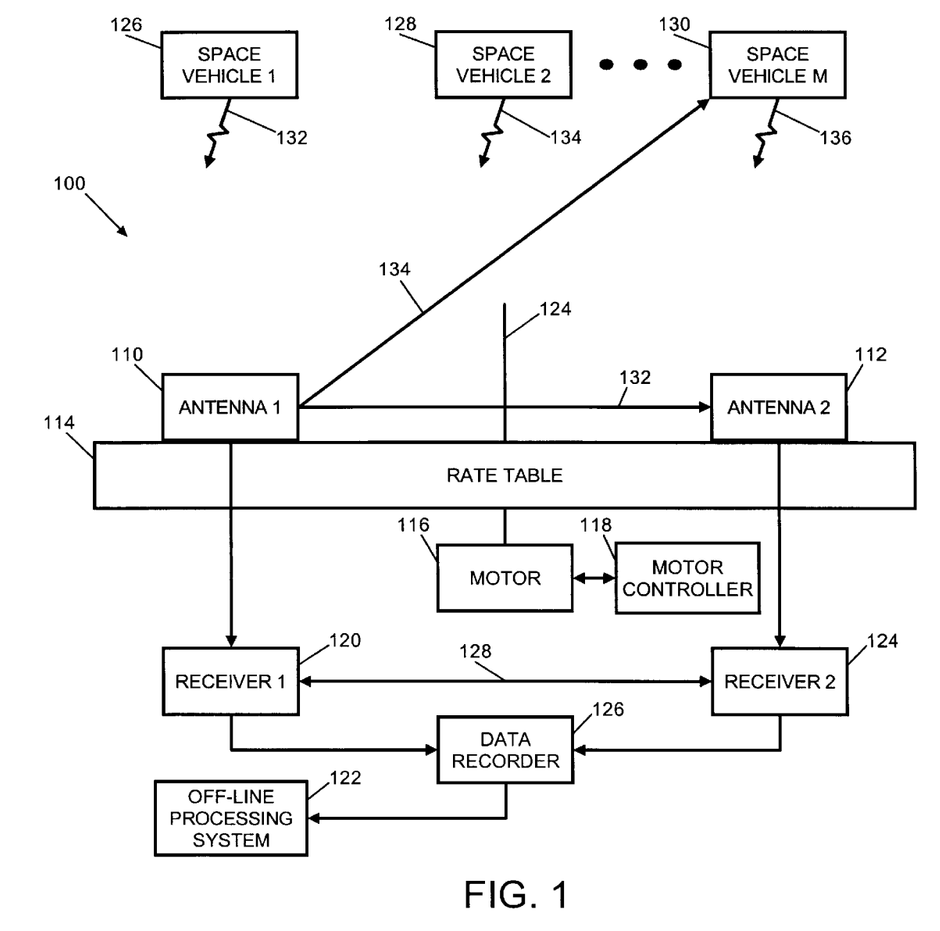
FIG. 1 is a diagram of a system tangibly embodying a method for determining a differential phase map in accordance with the present invention.

Referring now to FIG. 1, a system tangibly embodying the method for determining a differential phase map in accordance with the present invention will be discussed. The system 100 includes at least a first antenna 110 and a second antenna 112 together comprising an antenna system for which a differential phase map is generated. Antennas 110 and 112 are disposed on a rate table 114, a rotatable platform onto which antennas 110 and 112 are mounted for determining the differential phase map. Rate table 114 may be rotatably driven by a motor 116 that causes rate table 114 to rotate about an axis 124. Motor 116 may be driven by a motor controller 118 that causes rate table 114 to rotate at an approximately constant rate. Motor controller 118 may comprise the hardware necessary for applying and regulating power to motor 116 such that motor 116 causes rate table 114 to rotate at a constant rate. For example, motor controller 118 causes a voltage to be applied to motor 116 such that the motor operates at the predetermined rate.

As rate table 114 is caused to rotate, antennas 110 and 112 rotate about axis 124. Antennas 110 and 112 may then receive a reference signal from at least one space vehicle 130 in a constellation of M space vehicles, e.g., first space vehicle 126, second space vehicle 128, up to Mth space vehicle 130 each transmitting a signal 132, 134 and 136, respectively. For example, space vehicles 126, 128 and 130 may be global positioning system (GPS) satellites in the NavStar Global Positioning System maintained by the U.S. government and designated for both military and civilian applications. As antennas 110 and 112 are rotated through space, signal 136 broadcast from space vehicle 130 may be received by first and second receivers 120 and 124 coupled with antennas 110 and 112, respectively. First and second receivers 120 and 124 may each be a radio-frequency (RF) receiver designed to receive and process GPS type signals, for example, and are coupled via a common oscillator connection 128. Signals received by first and second receivers 120 and 124 are provided to a data recorder 126 and then to an off-line processing system 122 for information storage and processing, respectively. Data recorder 126 may be an information storage medium, for example a hard disk drive including input/output and control circuits. Off-line processing system 122 may be, for example, an analog system or a digital microprocessor based system that is capable of processing signals provided by first and second receivers 120 and 124, and is utilized to calculate the differential phase map for antennas 110 and 112. Antennas 110 and 112 are disposed at a distance apart such that a baseline vector 132 is defined. Furthermore, a line of sight vector 134 from one of antennas 110 and 112 to the Mth tracked space vehicle 130 may be defined.

Figure 2:
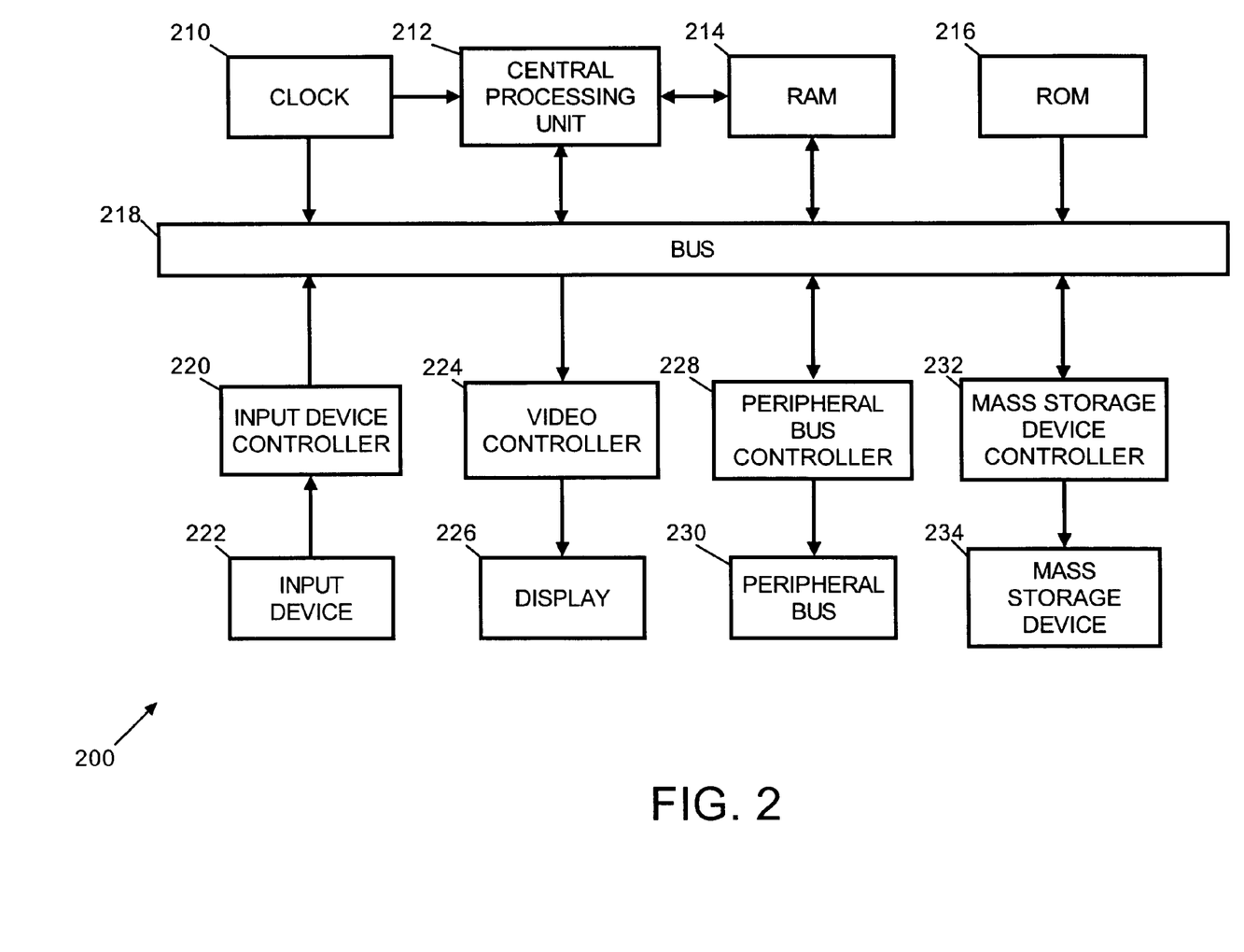
FIG. 2 is a block diagram of a computer hardware system operable to tangibly embody a digital processing system of the present invention.

Referring now to FIG. 2, a computer hardware system operable to tangibly embody a digital processing system of the present invention will be discussed. The computer system 200 may be utilized as off-line processing system 122 for calculating a differential phase error map in accordance with the present invention. Computer system 200 generally includes a central bus 218 for transferring data among the components of computer system 200. A clock 210 provides a timing reference signal to the components of computer system 200 via bus 218 and to a central processing unit 212. Central processing unit 212 is utilized for interpreting and executing instructions and for performing calculations for computer system 200. Central processing unit 212 may be a special purpose processor such as a digital signal processor. A random access memory (RAM) device 214 couples to bus 218 and to central processing unit 212 for operating as memory for central processing unit 212 and for other devices coupled to bus 218. A read-only memory device (ROM) 216 is coupled to the components of computer system 200 via bus 218 for operating as memory for storing instructions or data that are normally intended to be read but not to be altered except under specific circumstances (e.g., when the instructions or data are desired to be updated). ROM device 216 typically stores instructions for performing basic input and output functions for computer system 200 and for loading an operating system into RAM device 214.

An input device controller 220 is coupled to bus 218 for allowing an input device 222 to provide input signals into computer system 200. Input device 222 may be a keyboard, mouse, joystick, trackpad or trackball, microphone, modem, or a similar input device. Further, input device 222 may be a graphical or tactile input device such as a touch pad for inputting data with a finger or a stylus such. Such a graphical or tactile input device 222 may be overlaid upon a screen of a display device 226 for correlating the coordinates of a tactile input with information displayed on display 226. Display 226 is controlled by a video controller 224 that provides a video signal received via bus 218 to display 226. Display 226 may be any type of display or monitor suitable for displaying information generated by computer system 200 such as cathode ray tube (CRT), a liquid crystal display (LCD), gas or plasma display, or a field emission display panel. Preferably, display 226 is a flat-panel display having a depth being shallower than its width. A peripheral bus controller 228 couples peripheral devices to central bus 218 of computer system 200 via a peripheral bus 228. Peripheral bus 230 is preferably in compliance with a standard bus architecture such as an Electrical Industries Association Recommended Standard 232 (RS-232) standard, an Institute of Electrical and Electronics Engineers (IEEE) 1394 serial bus standard, a Peripheral Component Interconnect (PCI) standard, or a Universal Serial Bus (USB) standard, etc. Transceivers 120 and 124 may couple to digital processing systems 114 and 126, respectively, via peripheral bus 230, for example. A mass storage device controller 232 controls a mass storage device 234 for storing large quantities of data or information, such as a quantity of information larger than the capacity of RAM device 214. Mass storage device 232 is typically non-volatile memory and may be a disk drive such as a hard disk drive, floppy disk drive, optical disk drive, combination magnetic and optical disk drive, etc.

Figure 3:
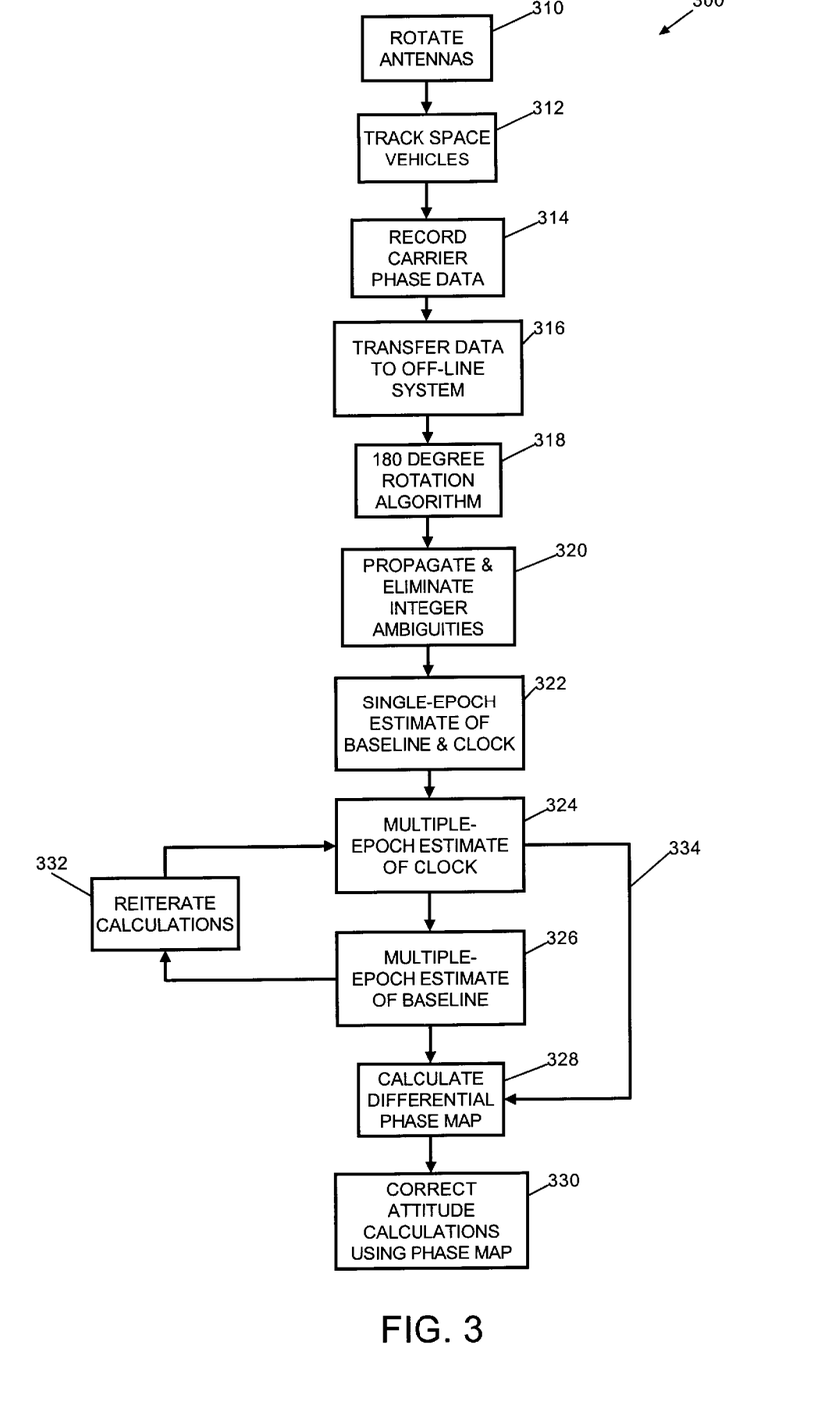
FIG. 3 is a flow diagram of a method for determining a differential phase map in accordance with the present invention.

Referring now to FIG. 3, a flow diagram of a method for determining a phase error map in accordance with the present invention will be discussed. In one embodiment of method 300, antennas 110 and 112 are rotated at a constant rate about axis 124 at step 310 whereby the calculation of the integer cycle ambiguity vector is simplified, and any uncertainty in the validity of the integer ambiguity solution is essentially removed. Signals 132, 134 and 136 from space vehicles 126, 128 and 130, respectively, are tracked at step 312 using one of receivers 120 and 124 for each antenna 110 and 112, respectively. Although there are at least two receivers, each of the at least two receivers 120 and 124 utilizes a common oscillator connection 128. A preferred embodiment of the method of the present invention utilizes the 180° rotation of baseline vector 132 about axis 124. In an alternative embodiment, method 300 may be adapted so that rotation through any known angle may be used. The difference in carrier phase measurements between receivers 120 and 124 is measured and recorded in data recorder 126 at step 314. If more than two antennas and receivers are utilized, the additional differences would also be recorded. The time sequence of phase measurements is then transferred to off-line processing system 122 at step 316 for post-processing. A 180-degree rotation algorithm may be executed at step 318 whereby an integer ambiguity vector is calculated using data from two epochs separated by 180 degrees of rotation. A preferred 180-degree rotation algorithm is described in the following text.

The unit line of sight matrix is given by:

$$L = [l_1 \ l_2 \ \ldots \ l_M] \tag{1}$$

where each column vector $l_m$ is a unit line of sight vector 134 to the Mth space vehicle 130 in local level coordinates. The measurement equation at time $t_i$ is given by:

$$\phi_i = L_i^T d_i + 1\delta t_i + N \tag{2}$$

where $\phi_i$ is a vector of single difference phase measurements, $L_i$ is the unit line of sight matrix, $d_i$ is the baseline vector, 1 is a vector containing ones, $\delta t_i$ is the clock offset between receivers, and N is a vector of integer ambiguities. The units of equation (2) are wavelengths, and the coordinate system for both $L_i$ and $d_i$ is local level. The subscript notation is used to indicate the epoch, i.e. $\phi_i$ is shorthand for $\phi(t_i)$. Having an a priori estimate of the rate at which rate table 114 is turning, time $t_j$ is chosen so that rate table 114 has turned 180° between $t_i$ and $t_j$. The measurement equation at time $t_j$ is given by:

$$\phi_j = L_j^T d_j + 1\delta t_j + N \tag{3}$$

If only satellites that are continuously tracked at step 312 from $t_i$ to $t_j$ are included in (2) and (3), then the vector of integer ambiguities N is the same for both equations. The integer ambiguities can be eliminated by subtracting (3) from (2):

$$\phi_i - \phi_j = L_i^T d_i - L_j^T d_j + 1\delta t_i - 1\delta t_j \tag{4}$$

Since rate table 114 turns 180° between $t_i$ and $t_j$, two baseline vectors 132 pointing in exactly opposite directions are given as follows:

$$d_j = -d_i \tag{5}$$

The time differenced clock offset and phase measurement vector are defined as:

$$\Delta \delta t = \delta t_i - \delta t_j \tag{6}$$

$$\Delta \phi = \phi_i - \phi_j \tag{7}$$

After applying the substitutions given by (5), (6) and (7), the time differenced measurement equation is:

$$\Delta \phi = (L_i^T + L_j^T) d_i + 1\Delta \delta t \tag{8}$$

Since the clock offset is common to all satellites 126–130, it can be eliminated by subtracting a reference satellite from all other satellites. The triple differenced measurement equation is:

$$\nabla \Delta \phi = \nabla (L_i^T + L_j^T) d_i \tag{9}$$

The matrix H is defined as follows:

$$H = \nabla (L_i^T + L_j^T) \tag{10}$$

Then the unweighted least squares solution for the baseline vector is:

$$d_i = (H^T H)^{-1} H^T \nabla \Delta \phi \tag{11}$$

For subsequent processing, the integer ambiguity vector and the clock offset for at least one epoch are utilized. The clock offset is eliminated from equation (2) by subtracting a reference satellite from all the other satellites:

$$\nabla \phi \text{hd } i = \nabla L_i^T d_i + \nabla N \tag{12}$$

Then the double differenced ambiguity vector is:

$$\nabla N = \text{round}(\nabla \phi_i - \nabla L_i^T d_i) \tag{13}$$

The single differenced ambiguity vector is constructed at step 322 from the double differenced integer ambiguity vector simply by appending a zero at the position of the reference satellite. For example, if the first satellite is chosen as the reference satellite, then the single difference integer ambiguity vector is:

$$N = \begin{bmatrix} 0 \\ \nabla N \end{bmatrix} \tag{14}$$

The integer ambiguity for the reference satellite is common to the single difference integer ambiguities for all the satellites, so the integer ambiguity for the reference satellite may be absorbed into the clock offset. The clock offset is estimated as:

$$\delta t_i = \frac{1}{M} 1^T (\phi_i - L_i^T d_i - N) \tag{15}$$

There can be some difficulty with the estimated clock offset changing when the reference satellite changes; however, this can be avoided by propagating the clock offset between epochs.

Once the integer ambiguity vector is found for at least one epoch, the baseline vector solution is propagated forward and backward in time at step 320, and integer ambiguities are eliminated. The integer ambiguity vectors are subtracted from the phase measurement vectors so that the phase measurements no longer contain an integer ambiguity. Since at least some of the data flow is backwards in time, step 320 is performed in post processing (i.e. not in real time) by off-line processing system 122. Method 300 described herein assumes that movement of baseline vector 132 between epochs combined with drift of the clock offset between epochs is much less than one-half of one wavelength. This requirement is easily satisfied.

The single difference integer ambiguity vector is calculated from:

$$N = \text{round}(\phi - L^T d^{(-)} - \delta t^{(-)}) \tag{16}$$

where $d^{(-)}$ and $\delta t^{(-)}$ are values from either the next or the previous epoch. The matrix G is defined as follows:

$$G = [L^T\ 1] \quad (17)$$

Then the least squares solution for baseline vector 132 and the clock offset is given by:

$$\begin{bmatrix} d \\ \delta t \end{bmatrix} = (G^T G)^{-1} G^T (\phi - N) \quad (18)$$

The baseline vector solution and clock errors are estimated in a single-epoch estimation step 322 for each epoch based only upon data for that epoch. The baseline vector solution may be calculated in a series of mathematical manipulations that follow. Although the integer ambiguity vector is propagated between epochs, the baseline solution and clock offset for each epoch are calculated using information from only a single epoch.

The axis of rotation of rate table 114 is orthogonal to baseline vector 132 for every epoch. If $d_m$ is baseline vector 132 at time $t_m$, and r is axis of rotation 124, then for all m:

$$d_m^T r = 0 \quad (19)$$

The requirement of equation (19) may be written in matrix notation. The matrix D is defined as:

$$D = \begin{bmatrix} d_1^T / \|d_1\| \\ d_2^T / \|d_2\| \\ \vdots \\ d_M^T / \|d_M\| \end{bmatrix} \quad (20)$$

Each row of D is a normalized baseline vector. The baseline vectors are normalized so that errors in the length of the estimate of the baseline will not interfere with the estimate of the axis of rotation. In matrix notation, (19) is equivalent to:

$$Dr = 0 \quad (21)$$

Thus, the null space of D has dimension of 1, and r is the basis vector for the null space of D. Equations (19) and (21) are written for noiseless data; however, in reality the estimated baseline vectors contain noise, so (21) cannot be exact. Instead, the following constrained optimization is solved:

$$\min \|Dr\| \text{ subject to } \|r\|=1 \quad (22)$$

The above optimization problem may be solved using the singular value decomposition (SVD). Let the SVD of D be given by:

$$D = U \Sigma V^T \quad (23)$$

where U and V are orthonormal matrices, and $\Sigma$ is a diagonal matrix. Furthermore:

$$r' = V^T r \quad (24)$$

The matrix $\Sigma$ is written as:

$$\sum = \begin{bmatrix} \sigma_1^2 & 0 & 0 \\ 0 & \sigma_2^2 & 0 \\ 0 & 0 & \sigma_3^2 \\ \hline & 0_{(M-3) \times 3} & \end{bmatrix} \quad (25)$$

where the singular values satisfy the inequality $\sigma_1^2 \leq \sigma_2^2 \leq \sigma_3^2$. Also, the matrix V is written as:

$$V = [v_1\ v_2\ v_3] \quad (26)$$

where $v_1$, $v_2$, and $v_3$ are column vectors. Then, the quantity to be minimized is expressed as:

$$\|Dr\| = \left\| U \sum V^T r \right\| = \left\| \sum V^T r \right\| = \left\| \sum r' \right\| = \sqrt{\sigma_1^2 (r')_1^2 + \sigma_2^2 (r')_2^2 \sigma_3^2 (r')_3^2} \quad (27)$$

The minimum value of (27) is $\sigma_3$ and the value of r' at the minimum is $[0\ 0\ 1]^T$. Therefore:

$$r = V r' = [v_1\ v_2\ v_3] \begin{bmatrix} 0 \\ 0 \\ 1 \end{bmatrix} = v_3 \quad (28)$$

Thus, the axis of rotation is given by the third column of V, so V can be written as:

$$V = [v_1\ v_2 \pm \hat{r}] \quad (29)$$

There is a sign ambiguity in the calculation of r, i.e., if the axis of rotation is approximately vertical, then $v_3$ can point either up or down. It is assumed that the sign of r is determined so that it always points up; otherwise, there may be an unintended reflection of coordinates when calculating the phase map.

The matrix V also represents a rotation in physical space, and the third column of V projects any given vector onto the axis of rotation. In other words, V represents a rotation of coordinates where the third coordinate axis is aligned with the axis of rotation. D' is defined as the matrix of baseline vectors rotated by V:

$$D' = DV = U\Sigma \quad (30)$$

The matrix V may also contain other reflections and rotations; however, these cancel out when the inverse rotation represented by $V^T$ is applied. The columns of D' are labeled as follows:

$$D' = [x'\ y'\ z'] \quad (31)$$

In the primed coordinate system, the rows of D' are vectors that rotate at a constant rate in the x-y plane. The rotation angle from any arbitrary starting point is calculated as follows:

$$\theta_m = \arctan\frac{y'_m}{x'_m} \tag{32}$$

The estimate of the true rotation angle denoted by $\theta_m$ is calculated by doing a curve fit to the set of points given by $(t_m, \theta_m)$ for all m. Note that it is necessary to unwrap the phase, since (32) will give the phase modulo $2\pi$. A linear curve fit is appropriate when the rotation rate is known to be absolutely constant. A second order polynomial fit may be used if there is a constant drift in the rotation rate, and a higher order curve fit can be used if necessary.

The estimate of the three components of the unit baseline vectors in the primed coordinate system is given by:

$$\hat{x}'_m = \cos\hat{\theta}_m \tag{33}$$

$$\hat{y}'_m = \sin\hat{\theta}_m \tag{34}$$

$$\hat{z}'_m = 0 \tag{35}$$

The a priori model of the baseline movement is now incorporated into the estimate of the baseline vectors. Define $\hat{D}'$, the estimate of D', as follows:

$$\hat{D}' = [\hat{x}' \ \hat{y}' \ \hat{z}'] \tag{36}$$

Then rotate the unit baseline vectors back to the local level coordinate system:

$$\hat{D} = \hat{D}'V^T \tag{37}$$

The rows of $\hat{D}$ are unit vectors. An estimate of the length of the baseline vector $\|\hat{d}\|$ can be calculated by averaging the lengths of the measured baseline vectors $d_m$ for all m. Let the estimate of the baseline vectors be denoted by $\hat{d}_m$; then the estimated baseline vectors are the rows of the matrix $\hat{D}$ scaled by $\|\hat{d}\|$:

$$\begin{bmatrix} \hat{d}_1^T \\ \hat{d}_2^T \\ \vdots \\ \hat{d}_M^T \end{bmatrix} = \|\hat{d}\|\hat{D} \tag{38}$$

Using the integer ambiguity vector and estimate of the baseline previously calculated, the clock offset for each epoch is given by:

$$\delta t = \frac{1}{S}1^T(\phi - L^T\hat{d} - N) \tag{39}$$

where S is the number of space vehicles (satellites). The estimate of the clock offset $\hat{\delta t}$ can then be calculated by doing a curve fit to the set of points $(t_m, \delta t_m)$.

A multiple-epoch clock estimate is calculated by executing step 324 in which the estimates for all the clock errors for each epoch calculated in step 322 are combined to calculate estimates of the clock errors for all epochs based on data from all epochs. The estimated clock errors are subtracted from the data. Since all samples of the output depend on all samples of the input, the data flow is both forward and backward in time. Therefore, step 324 is also performed in post-processing. The estimates of the baseline vectors for each epoch calculated at step 322 are combined to calculate estimates of the baseline vectors for all epochs based on data for all epochs at step 326. The effect of the baseline rotation is calculated and subtracted from the data. Step 326 is also performed in post-processing. An improved estimate of the baseline vectors may be calculated at step 326 using the new estimate of the clock drift in step 324. In theory, execution of steps 324 and 326 is an iterative algorithm, and additional iterations may be performed by executing step 332. Steps 324 and 326 may be repeated in sequence as many times as necessary, but in a preferred embodiment it is sufficient to only repeat step 324 and then continue with step 328 by optionally bypassing step 326 at bypass step 334.

The differential phase map is calculated at step 328 and consists of a plot of the phase residuals as a function of azimuth and elevation in a coordinate system that rotates with antennas 110 and 112. The data is sorted into bins that are a function of the location of space vehicles 126, 128 and 130 relative to an antenna array comprising antennas 110 and 112. Using previously calculated estimates of the baseline vector, clock offset, and integer ambiguity vector, the phase residual is calculated as:

$$\phi_r = \phi - L^T\hat{d} - 1\hat{\delta t} - N \tag{40}$$

A rotation matrix to transform local level coordinates into a coordinate system fixed to the antennas must be constructed. Let the matrix be denoted by T. The convention utilized is where the x axis of the rotating coordinate system is aligned with baseline vector 132, the z axis is aligned with axis of rotation 124, and the y axis is determined so that the coordinate system is right handed. The rotation matrix T satisfies:

$$\begin{bmatrix} 1 & 0 & 0 \\ 0 & 1 & 0 \\ 0 & 0 & 1 \end{bmatrix} = T\left[\frac{\hat{d}}{\|\hat{d}\|} \ \bigg| \ \hat{r} \times \frac{\hat{d}}{\|\hat{d}\|} \ \bigg| \ \hat{r}\right] \tag{41}$$

Since the matrix on the left is an identity matrix, and the matrix on the right is orthonormal, the rotation matrix is:

$$T = \left[\frac{\hat{d}}{\|\hat{d}\|} \ \bigg| \ \hat{r} \times \frac{\hat{d}}{\|\hat{d}\|} \ \bigg| \ \hat{r}\right]^T \tag{42}$$

The line of sight vectors are transformed into the rotating coordinate system using the rotation matrix T:

$$L' = TL \tag{43}$$

The differential phase map is a function of the angle of arrival of the incoming electromagnetic wave with respect to the antenna array. The angle of arrival is given by the unit line of sight vector in the primed coordinate system; however, since the line of sight vector has three components but only two degrees of freedom, the unit line of sight vector is a poor way to parameterize the phase map. One way to parameterize the phase map is to use the heading and elevation of the unit line of sight vector in the primed coordinate system. If l' is a unit line of sight vector in the primed coordinate system, then the heading $\Psi'$ and elevation $\theta'$ are:

$$\Psi' = \arctan\frac{l'_2}{l'_1} \tag{44}$$

$$\theta' = \arcsin\frac{l'_3}{\|l'\|} \tag{45}$$

The heading and elevation can then be remapped into rectangular coordinates as follows:

$$x' = \left(\frac{\pi}{2} - \theta'\right)\cos\Psi' \tag{46}$$

$$y' = \left(\frac{\pi}{2} - \theta'\right)\sin\Psi' \tag{47}$$

This primed coordinate system is not the same as the primed coordinate system of the all epoch solution. The (x', y') coordinate system is convenient for plotting the phase map. Thus, errors in subsequent attitude calculations using antennas 110 and 112 may be reduced or effectively eliminated by correcting the attitude calculations at step 330 with the differential phase map produced by method 300. This may be accomplished by loading the phase map into an attitude determination system that utilizes antennas 110 and 112, and then using the phase map to correct the differential phase measurements.

It is believed that the method for determining a phase measurement error map using rotating antenna information of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method for determining a differential phase map for an antenna system utilized in attitude determination, comprising:

rotating at least two antennas about an axis of rotation;

receiving a carrier signal with said at least two antennas;

determining phase measurement information from the carrier signal received by each of said at least two antennas; and calculating a differential phase map from the determined phase measurement information whereby the differential phase map may be utilized to correct differential phase measurements in an attitude determination system that utilizes said at least two antennas.

2. A method as claimed in claim 1, further comprising the steps of recording the phase measurement information and transferring the phase measurement information to an off-line processing system.

3. A method as claimed in claim 1, said determining step further comprising the steps of executing a 180-degree rotation algorithm by which an integer ambiguity solution vector is calculated, propagating the integer ambiguity solution forwards and backwards in time, providing a single-epoch estimate of baseline vectors and clock errors, providing a multiple-epoch estimate of clock errors, and providing a multiple-epoch estimate of baseline vectors.

4. A method as claimed in claim 3, said determining step further comprising the step of repeating the multiple-epoch estimate of clock errors a predetermined number of times.

5. A method as claimed in claim 3, said determining step further comprising the step of repeating the multiple-epoch estimate of baseline vectors a predetermined number of times.

6. A method as claimed in claim 3, wherein the multiple-epoch estimate of clock errors is reiterated once.

7. A method as claimed in claim 1, wherein said at least two antennas are rotated at a constant rate.

8. A method for determining a differential phase map for an antenna system utilized in attitude determination, comprising:

a step for rotating at least two antennas about an axis of rotation;

a step for receiving a carrier signal with said at least two antennas;

a step for determining phase measurement information from the carrier signal received by each of said at least two antennas; and a step for calculating a differential phase map from the determined phase measurement information whereby the differential phase map may be utilized to correct differential phase measurements in an attitude determination system that utilizes said at least two antennas.

9. A method as claimed in claim 8, further comprising steps for recording the phase measurement information and for transferring the phase measurement information to an off-line processing system.

10. A method as claimed in claim 8, said determining step further comprising a step for executing a 180-degree rotation algorithm by which an integer ambiguity solution vector is calculated, a step for propagating the integer ambiguity solution forwards and backwards in time, a step for providing a single-epoch estimate of baseline vectors and clock errors, a step for providing a multiple-epoch estimate of clock errors, and a step for providing a multiple-epoch estimate of baseline vectors.

11. A method as claimed in claim 10, said determining step further comprising a step for repeating the multiple-epoch estimate of clock errors a predetermined number of times.

12. A method as claimed in claim 10, said determining step further comprising a step for repeating the multiple-epoch estimate of baseline vectors a predetermined number of times.

13. A method as claimed in claim 10, wherein the multiple-epoch estimate of clock errors is reiterated once.

14. A method as claimed in claim 8, wherein said at least two antennas are rotated at a constant rate.

15. A program of instructions storable on a computer readable medium for causing a computer to execute steps for determining a differential phase map for an antenna system utilized in attitude determination, the steps comprising:

receiving a carrier signal with at least two antennas while said at least two antennas are rotating about an axis of rotation;

determining phase measurement information from the carrier signal received by each of said at least two antennas; and calculating a differential phase map from the determined phase measurement information whereby the differential phase map may be utilized to correct differential phase measurements in an attitude determination system that utilizes said at least two antennas.

16. A program of instructions as claimed in claim 15, the steps further comprising the steps of recording the phase measurement information and transferring the phase measurement information to an off-line processing system.

17. A program of instructions as claimed in claim 15, said determining step further comprising the steps of executing a 180-degree rotation algorithm by which an integer ambiguity solution vector is calculated, propagating the integer ambiguity solution forwards and backwards in time, providing a single-epoch estimate of baseline vectors and clock errors, providing a multiple-epoch estimate of clock errors, and providing a multiple-epoch estimate of baseline vectors.

18. A program of instructions as claimed in claim 17, said determining step further comprising the step of repeating the multiple-epoch estimate of clock errors a predetermined number of times.

19. A program of instructions as claimed in claim 17, said determining step further comprising the step of repeating the multiple-epoch estimate of baseline vectors a predetermined number of times.

20. A program of instructions as claimed in claim 17, wherein the multiple-epoch estimate of clock errors is reiterated once.

* * * * *